United States Patent Office 3,336,189
Patented Aug. 15, 1967

3,336,189
COMPOSITION AND METHOD OF INDUCING
3,3,3-TRICHLORO - 1,1,2,2 - TETRAFLUORO-
PROPANE ANESTHESIA
Bernard M. Regan, Chicago, Ill., assignor to Baxter Laboratories, Inc., Morton Grove, Ill., a corporation of Delaware
No Drawing. Filed Feb. 2, 1966, Ser. No. 524,451
2 Claims. (Cl. 167—52)

This invention relates to a novel polyhalotetrafluoropropane. More particularly, this invention relates to a trichlorotetrafluoropropane having three chlorine atoms substituted on the number three carbon atom, namely, 3,3,3-trichloro-1,1,2,2-tetrafluoropropane.

It is known that certain halogenated alkanes are useful inhalation anesthetics. Chloroform and halothane are well-known examples of such compounds which are halogen derivatives of the lower alkanes, methane and ethane, respectively. More recently, it has also been found that certain halogenated propanes are useful inhalation anesthetics. Thus, Dishart, U.S. Patent 3,034,959, discloses the inhalation anesthetic use of 3-bromo-1,1,2,2-tetrafluoropropane and Dutton et al., British Patent 1,004,606, discloses the inhalation anesthetic use of 3,3-dichloro-1,1,2,2-tetrafluoropropane.

Position isomers of the compound of this invention also are known. Thus, Davis and Whaley, 72, J. Am. Chem. Soc., 4637–8 (1950), discloses 1,2,2-trichloro-1,1,3,3-tetrafluoropropane; McBee et al., 62, J. Am. Chem. Soc., 3340–1 (1940), Joyce, U.S. Patent 2,462,402, and Henne et al., 76, J. Am. Chem. Soc., 479–81 (1954), disclose 1,1,3-trichloro-2,2,3,3-tetrafluoropropane; Coffman et al., 71, J. Am. Chem. Soc. 979–80 (1949), disclose 1,3,3-trichloro-1,2,2,3-tetrafluoropropane; McBee et al., 70, J. Am. Chem. Soc., 2023–4 (1948), disclose 1,1,2-trichloro-1,3,3,3-tetrafluoropropane; Arnold, U.S. Patent 2,560,838, discloses 1,1,2-trichloro-1,3,3,3-tetrafluoropropane; Henne et al., 61, J. Am. Chem. Soc., 2489–91 (1939) disclose 1,1,2-trichloro-2,3,3,3-tetrafluoropropane; and Hennes et al., 63, J. Am. Chem. Soc., 3476–8 (1941), disclose 1,2,3-trichloro-1,2,3,3-tetrafluoropropane. However, the above compounds have not been known as clinically useful inhalation anesthetics. Certain other related halogenated tetrafluoropropanes, e.g. 1,3,3,3-tetrachloro-1,1,2,2-tetrafluoropropane, are non-anesthetic and convulsant.

It has now been found that the novel 3,3,3-trichloro-1,1,2,2-tetrafluoropropane of this invention is a useful nonflammable inhalation anesthetic in mice and rabbits, which is less hepatotoxic in mice than halothane which is a halogenated fluoroalkane in current use as an inhalation anesthetic. Moreover, the novel compound of this invention is soda lime stable as distinguished from other inhalation anesthetic compounds, such as the 3,3-dichloro-1,1,2,2-tetrafluoropropane of Dutton et al., which are not soda lime stable. The compound of this invention also has a good inhalation margin of safety, being substantially comparable to the margin of safety of ether, chloroform, and halothane. As such, the compound of this invention holds good promise as an effective and useful agent for inducing anesthesia in man.

The novel trichlorotetrafluoropropane defined herein can be employed as an inhalation anesthetic agent by utilizing apparatus or machines designed for the vaporization of liquid anesthetics and the admixture thereof with oxygen, air, or other gaseous mixtures containing oxygen in amounts capable of supporting respiration.

The novel anesthetic should be free from toxic impurities which may be present according to the particular method of preparation. It may be admixed with other pharmaceutically acceptable materials such as stabilizers, e.g., thymol, or one or more known inhalation anesthetics, e.g., nitrous oxide, ether, chloroform, halothane cyclopropane and methoxyflurane.

The 3,3,3-trichloro-1,1,2,2-tetrafluoropropane boils at 98° C. and can be conveniently stored in containers normally used for conventional anesthetics of comparable boiling point, e.g., ether, chloroform. and halothane.

The novel trichlorotetrafluoropropane of the present invention can be conveniently prepared by the photoinduced chlorination of 3,3-dichloro-1,1,2,2-tetrafluoropropane with about 0.5 to about 1.0 molar equivalent of chlorine, preferably at about 20°–70° C. and then separating the 3,3,3-trichloro-1,1,2,2-tetrafluoropropane from the reaction mixture.

Another convenient method of preparing the novel trichlorotetrafluoropropane defined herein comprises the photoinduced chlorination of 3-chloro-1,1,2,2-tetrafluoropropane with about 1.5 to about 2.0 molar equivalents of chlorine, preferably at about 20° C.–70° C. followed by separating the 3,3,3-trichloro-1,1,2,2-tetrafluoropropane from the reaction mixture.

Although the above methods and reaction conditions are specifically described, it will be understood that the novel compound of this invention is not limited to these specific reaction conditions or to these specific methods of preparation.

The following examples will further illustrate the present invention although the invention is not limited to these specific examples.

Example 1

(a) *3,3-dichloro-1,1,2,2-tetrafluoropropane (I)*. —Dry chlorine gas (2000 gm., 28 moles) was dispersed during 72 hours into 3-chloro-1,1,2,2-tetrafluoropropane (8250 gm., 54.8 moles) at 20°–26° C. with illumination through a Pyrex sleeve from an immersion type, water cooled ultraviolet lamp. The reactants were contained in a Pyrex flask fitted with a cold water reflux condenser surmounted by a Dry Ice cooled reflux condenser connected to a Dry Ice cooled trap. The reaction product was washed with water, neutralized by a dilute aqueous sodium hydroxide wash containing also a little sodium sulfite. It was dried by azeotropic distillation and fractionally distilled at atmospheric pressure through a 4 ft. column packed with Hastelloy "B" helicies at a 20:1 reflux ratio. The first fraction was unchanged starting chloride (4247 gm., 28.2 moles) B. 54.0–54.3° C. Next a fraction (841 gm.) B. 54.3–77.0° C., was mainly 1,3-dichloro-1,1,2,2-tetrafluoro propane. Substantially pure (99.9% by G.L.C.) I, B. 77.0–77.5° C., comprised the next fraction (3073 gm., 16.6 moles). The residue (794 gm.) was mainly II. Pure I has $B_{.760}$ 77.5° C., $d_4^{20}$ 1.5626, $n_D^{20}$ 1.3557 and a vapor pressure of 74 mm. Hg at 20° C. Its vapor pressure-temperature equation is log $P = 8.0260 - 1804.2/T$. Its $CHF_2$—$CF_2$—$CHCl_2$ structure is evident from its 60 MC nuclear magnetic resonance (NMR), infrared and mass spectra.

*Analysis.*—Calculated for $C_3H_2Cl_2F_4$: C, 19.46%; H, 1.09%; Cl, 38.34%. Found: C, 19.76%; H, 1.29%; Cl, 38.60%.

(b) *3,3,3-trichloro-1,1,2,2 - tetrafluoropropane (II).*—Photochlorination of I (1250 gm., 6.75 moles) at 20°–26° C. with dry gaseous chlorine (480 gm., 6.75 moles) was done according to the procedure of Example I(a), above, except the Dry Ice cooled condenser was omitted. The washed and dried product weighed 1580 gm. Fractional distillation gave unchanged dichloride I (156 gm., 0.84 mole), B.$_{750}$ 77.2–77.6° C., and then a fraction (124 gm.) B.$_{740}$ 77.6–97.4° C. Relatively pure (99.0% by G.L.C.) II, B.$_{748}$ 97.4–97.8° C., $d_4^{20}$ 1.6542 and $n_D^{20}$ 1.3816, was collected (990 gm., 4.5 moles) next. Its NMR and infrared spectra confirm the $$CHF_2—CF_2—CCl_3$$

structure.

The remainder was mainly 1,3,3,3-tetrachloro-1,1,2,2-tetrafluoropropane (III). A fraction, B.$_{755}$ 112° C., was 99.96% pure by G.L.C. Its infrared spectrum confirms the $CClF_2—CF_2—CCl_3$ structure. This compound has been reported [1] to have B.P. 112°–112.5° C., $d_4^{20}$ 1.6992 and $n_D^{20}$ 1.3961.

*Example II*

The soda lime stability of the novel inhalation anesthetic of the present invention was determined essentially according to the method of Glover and Hodgson, 16 Anesthesia 19–23 (1961). The liquid anesthetic (0.65 ml.) and soda lime (0.50 gm., 8–12 mesh, 15–20% by weight of water) were sealed in a glass ampule and heated at 70° C. for three hours and then analyzed by gas-liquid partition chromatography. For purposes of comparison, a liquid anesthetic blank was treated the same way in the absence of soda lime. The chromatographic results are given in Table I, below, in which "R.T." is retention time in minutes from air and "Area percent" is 100 times the ratio of the area under a peak to the total area under all peaks in the recorded chromatogram. A column ten feet long and ¼ inch in diameter packed with 20% diisodecylphthalate on 80–100 mesh firebrick and a thermoconductivity detector were employed in the study. For purposes of comparison, similar data which was obtained under the same conditions as for the above compound is given for halothane and 3,3-dichloro-1,1,2,2-tetrafluoropropane.

TABLE I.—SODA LIME STABILITY OF ANESTHETICS

| Compound | Blank | | | | Soda Lime Treated | | | |
|---|---|---|---|---|---|---|---|---|
| | R.T. | Area Percent | R.T. | Area Percent | R.T. | Area Percent | R.T. | Area Percent |
| $CHF_2—CF_2—CCl_3$ | 3.9 | 99.9 | 3.9 | 99.9 | | | | |
| $CHF_2—CF_2—CHCl_2$ | 7.2 | 99.9+ | | | 5.6 | 53.3 | 7.3 | 46.6 |
| Halothane | 7.2 | 99.9+ | | | 4.2 | 0.20 | 7.2 | 99.8 |

The remarkable soda lime stability of the novel trichlorotetrafluoropropane of this invention is shown by the correspondence in the 99.9 area percent after 3.9 minutes of retention time in the blank sample and the soda lime treated sample.

*Example III*

Inhalation of the vapor of 3,3,3-trichloro-1,1,2,2-tetrafluoropropane admixed with air according to the procedure described by Robbins, 86 J. Pharmacol. Exper. Therap. 197–204 (1946), produced anesthesia in white mice. The minimum concentration by volume percent needed to produce full anesthesia in 50% of the mice in five minutes, $AC_{50}$, and the minimum concentration by volume percent needed to kill 50% of the mice in five minutes, $LC_{50}$, are given in Table II, below. The inhalation margin of safety as measured in mice by the $LC_{50}/AC_{50}$ ratio is also given for the above compounds. For purposes of comparison, similar data which was obtained under the same conditions as for the above compound is given for three inhalation anesthetics in current use, viz., ether, chloroform, and halothane. The number of mice used with the different agents varied from 25 to 92 for determining each of the $AC_{50}$ and $LC_{50}$ doses.

TABLE II.—INHALATION ANESTHESIA IN MICE

| Compound | $AC_{50}$ | $LC_{50}$ | $LC_{50}/AC_{50}$ |
|---|---|---|---|
| $CHF_2—CF_2—CCl_3$ | 0.36 | 1.13 | 3.1 |
| Ether | 3.38 | 13.6 | 3.5 |
| Chloroform | 0.95 | 2.63 | 2.8 |
| Halothane | 0.78 | 2.74 | 3.5 |

The results set forth in the above table show that the inhalation margin of safety of the novel trichlorotetrafluoropropane of this invention is better than the margin of safety shown by chloroform and nearly as good as that shown by ether and halothane.

*Example IV*

The hepatotoxicity of the novel inhalation anesthetic of the present invention was determined essentially according to the method of Jones et al., 19 Anesthesiology 715–23 (1958). The anesthetic was dissolved in corn oil and administered to white mice by gavage. The MHT 3+ is the minimal dose causing severe microscopic manifestations of hepatotoxicity (fatty change) 24 hours after administration. The $AD_{50}$ is the dose causing anesthesia in 50% of the test mice in 10 minutes; the $LD_{50}$ is the dose causing death in 50% of the test mice in 24 hours. The hepatotoxic margin of safety by the oral route in mice is given by the ratio, MHT 3+/$AD_{50}$ and is recorded in Table III, below. For purposes of comparison, similar data which was obtained under the same conditions as for the above compound is given for three inhalation anesthetics in current use, viz., ether, chloroform, and halothane.

TABLE III.—ORAL HEPATOTOXICITY IN MICE

| Compound | MHT 3+ mM./kg. | $AD_{50}$ mM./kg. | $LD_{50}$ mM./kg. | MHT 3+/$AD_{50}$ |
|---|---|---|---|---|
| $CHF_2—CF_2—CCl_3$ | 37 | 14 | 58 | 2.6 |
| Ether | 58 | 30 | 37 | 1.9 |
| Chloroform | 3.1 | 24 | *23 | 0.13 |
| Halothane | 2.4 | 23 | 62 | 0.10 |

*After 48 hours the $LD_{50}$ was only 4.8. Chloroform was the only anesthetic tested which showed significant mortality later than 24 hours after administration.

The results set forth in the above table show a substantial and significant improvement in the hepatotoxic margin of safety by administration of the novel com- ---
[1] McBee et al., 62 J. Am. Chem. Soc. 3340 (1940).

pound of this invention by the oral route as compared to the three inhalation anesthetics in current use.

*Example V*

The inhalation anesthetic property of the novel compound of this invention was shown in rabbits. Inhalation of 2–3% concentration by volume of the vapor of 3,3,3-trichloro-1,1,2,2-tetrafluoropropane admixed with oxygen gave smooth induction to and recovery from full surgical anesthesia in six rabbits tested. The anesthetic compositions used in this example were produced by a conventional anesthetic machine. A closed circle system with a soda lime absorber was employed.

Variations and modifications may be made in the present invention without departing from the spirit or scope thereof, and it is to be understood that all such variations and modifications are included within the scope of the invention as defined in the appended claims.

What is claimed is:

1. The method of inducing anesthesia in animals which comprises administering to said animals an effective amount of 3,3,3-trichloro-1,1,2,2-tetrafluoropropane.

2. A nonflammable inhalent anesthetic composition which is stable in the presence of soda-lime comprising 3,3,3-trichloro-1,1,2,2-tetrafluoropropane in admixture with oxygen in suitable proportions for the production of anesthesia.

References Cited

UNITED STATES PATENTS

| 3,080,430 | 3/1963 | Cohen | 167—52 |
| 3,177,260 | 4/1965 | Muray | 167—52 |

FOREIGN PATENTS

| 583,874 | 1/1947 | Great Britain. |
| 1,004,606 | 9/1965 | Great Britain. |

ALBERT T. MEYERS, *Primary Examiner.*

SAM ROSEN, *Examiner.*

JEROME D. GOLDBERG, *Assistant Examiner.*